(12) United States Patent
Mullen et al.

(10) Patent No.: US 11,660,932 B2
(45) Date of Patent: May 30, 2023

(54) AIR PURGING SYSTEM

(71) Applicant: Ford Global Technologies, LLC, Dearborn, MI (US)

(72) Inventors: Gary D. Mullen, Plymouth, MI (US); Daniel Ferretti, Commerce Township, MI (US); Tim Rush, Ann Arbor, MI (US); Wojciech Mariusz Wyrwa, South Lyon, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 564 days.

(21) Appl. No.: 16/775,312

(22) Filed: Jan. 29, 2020

(65) Prior Publication Data
US 2021/0229527 A1    Jul. 29, 2021

(51) Int. Cl.
*B60H 1/24*    (2006.01)
*B60H 1/00*    (2006.01)
*B60R 11/00*    (2006.01)

(52) U.S. Cl.
CPC ......... *B60H 1/249* (2013.01); *B60H 1/00521* (2013.01); *B60R 11/00* (2013.01); *B60R 2011/0026* (2013.01)

(58) Field of Classification Search
CPC .... B60H 1/249; B60H 1/00521; B60H 1/242; B60H 1/248; B60H 1/267; B60H 1/00564; B60R 11/00; B60R 2011/0026
See application file for complete search history.

(56) References Cited

U.S. PATENT DOCUMENTS

| 4,986,169 A * | 1/1991 | Chen .................. B60H 1/00471 |
| | | 454/131 |
| 5,205,781 A * | 4/1993 | Kanno ................... B60H 1/249 |
| | | 62/235.1 |
| 6,685,099 B2 * | 2/2004 | Rutyna .................. B60H 1/248 |
| | | 454/258 |
| 9,889,723 B2 * | 2/2018 | Marleau, Jr. ........... B60H 1/249 |
| 10,399,409 B2 | 9/2019 | Wang et al. |

(Continued)

FOREIGN PATENT DOCUMENTS

| CN | 103538446 A | 1/2014 |
| CN | 203837174 U | 9/2014 |

(Continued)

OTHER PUBLICATIONS

Hwang, KR 10-2012-0063250 A English machine translation, Jun. 15, 2012 (Year: 2012).*

*Primary Examiner* — Vivek K Shirsat
(74) *Attorney, Agent, or Firm* — Vichit Chea; Price Heneveld LLP

(57) ABSTRACT

A vehicle air purging system includes a vehicle body that defines an interior. A support member is coupled to the vehicle body. The support member defines a receiving cavity. The support member defines an aperture proximate the receiving cavity. A one-way valve is coupled to the support member and is disposed within the aperture. A fan is coupled to the support member. The fan includes an outlet aligned with the aperture. A controller is operably coupled to the fan. The controller is configured to activate the fan to blow air from the interior to an area external to the vehicle body through the one-way valve.

18 Claims, 13 Drawing Sheets

(56) References Cited

U.S. PATENT DOCUMENTS

| | | | | |
|---|---|---|---|---|
| 10,717,473 B2 * | 7/2020 | Richardson | ............ | B60H 1/249 |
| 2011/0151761 A1 * | 6/2011 | Lesle | ..................... | B60H 1/267 454/75 |
| 2016/0214459 A1 * | 7/2016 | Sawyer | ................ | B60H 3/0085 |
| 2018/0281560 A1 * | 10/2018 | Dearth | ............... | B60H 1/00978 |
| 2018/0334010 A1 * | 11/2018 | Wang | .................... | B60H 1/008 |

FOREIGN PATENT DOCUMENTS

| | | | | |
|---|---|---|---|---|
| GB | 2293002 A | * | 3/1996 | ............ B60H 1/248 |
| JP | H02256510 A | | 10/1990 | |
| JP | 2005035390 A | * | 2/2005 | |
| JP | 2006213082 A | * | 8/2006 | |
| JP | 2007326444 A | * | 12/2007 | |
| KR | 200367918 Y1 | * | 11/2004 | |
| KR | 200367919 Y1 | * | 11/2004 | |
| KR | 200367920 Y1 | * | 11/2004 | |
| KR | 20120063250 A | * | 6/2012 | |

\* cited by examiner

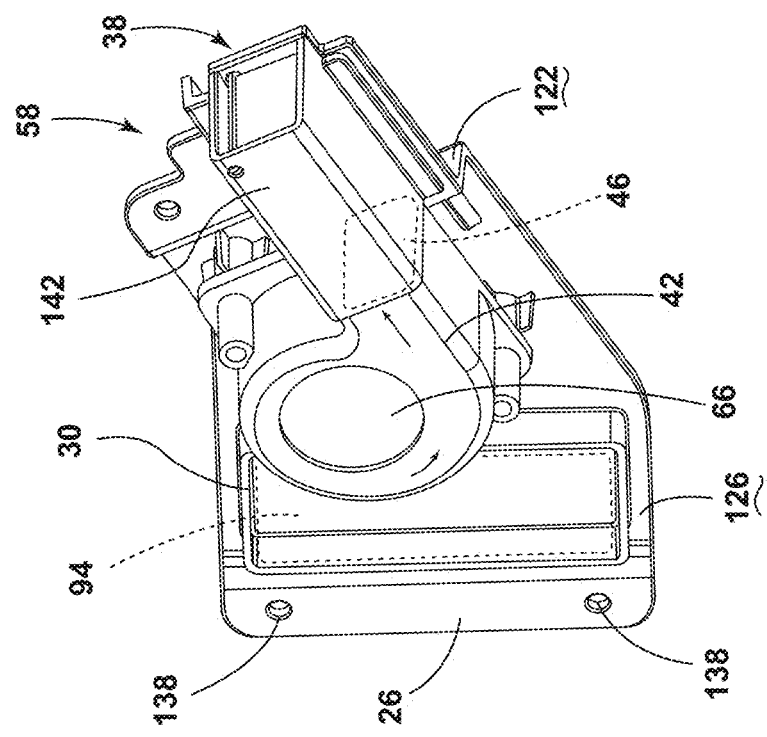
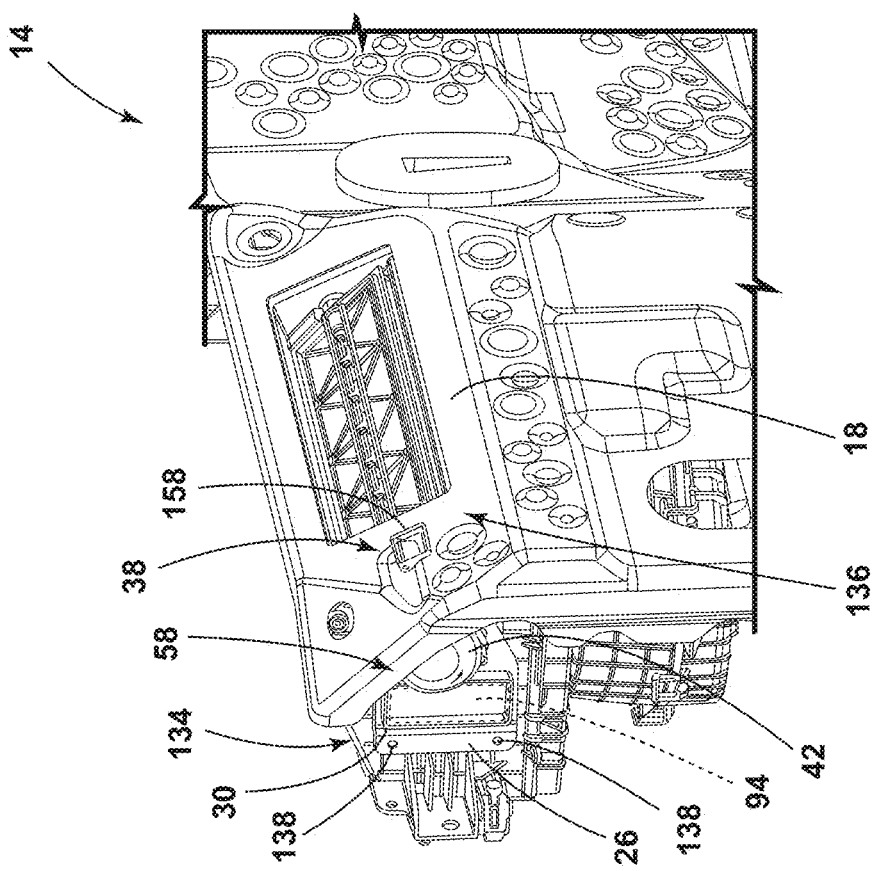
FIG. 14
FIG. 13

AIR PURGING SYSTEM

FIELD OF THE DISCLOSURE

The present disclosure generally relates to an air purging system. More specifically, the present disclosure relates to a vehicle air purging system.

BACKGROUND OF THE DISCLOSURE

Many newly manufactured vehicles have a "new car smell" characteristic. The "new car smell" is often caused by volatile organic compounds (VOCs). VOCs are organic chemicals having low boiling points and a high vapor pressure at ambient temperatures.

SUMMARY OF THE DISCLOSURE

According to at least one aspect of the present disclosure, a vehicle air purging system includes a vehicle body that defines an interior. A support member is coupled to the vehicle body. The support member defines a receiving cavity. The support member defines an aperture proximate the receiving cavity. A one-way valve is coupled to the support member and is disposed within the aperture. A fan is coupled to the support member. The fan includes an outlet aligned with the aperture. A controller is operably coupled to the fan. The controller is configured to activate the fan to blow air from the interior to an area external to the vehicle body through the one-way valve.

According to another aspect of the present disclosure, an air purging system for a vehicle includes a support member. A fan is coupled to the support member. A one-way valve is in fluid communication with the fan. The fan is configured to direct air through the one-way valve. A power source is coupled to the support member. The power source is operably coupled to the fan. A controller is operably coupled to the fan. The controller is configured to activate the fan.

According to another aspect of the present disclosure, a method for purging air from within an interior of a vehicle includes providing the vehicle in a deactivated condition. An air purging assembly is formed having a support member coupled to a fan. The air purging assembly is coupled to the vehicle. The fan is positioned within an interior of the vehicle and is in fluid communication with an area external to the vehicle. A fan is selectively activated for a predetermined amount of time. Air is blown from the interior to the area external to the vehicle through a one-way valve.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 13 is a partial front perspective view of the air purging system of FIG. 11;

FIG. 14 is a side perspective view of an air purging system for a vehicle, according to one example;

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
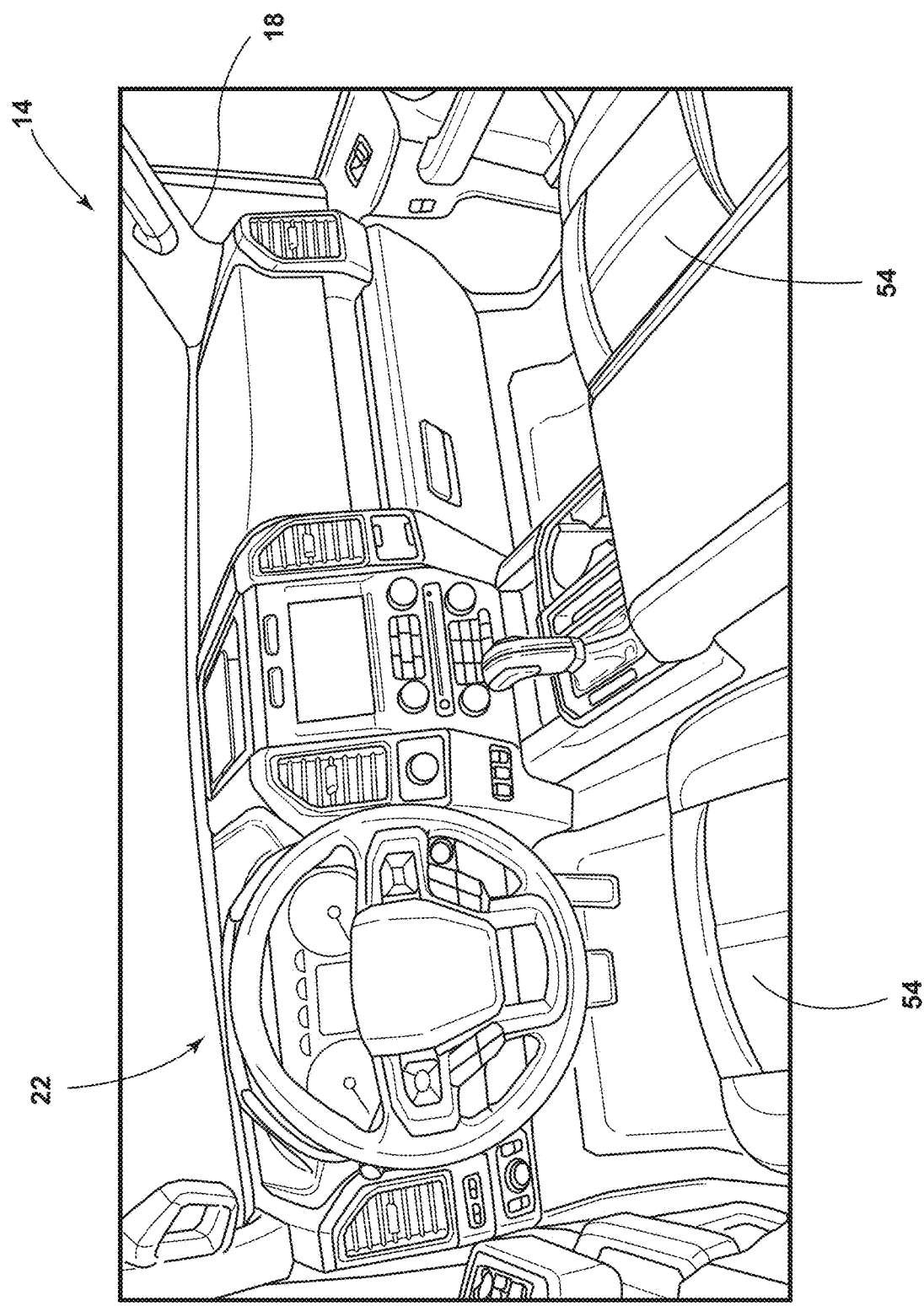
FIG. 1 is a side perspective view of a passenger cabin of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone;

A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-17, reference numeral 10 generally refers to an air purging system for a vehicle 14. A vehicle body 18 defines an interior 22. A support member 26 is coupled to the vehicle body 18. The support member 26 defines a receiving cavity 30. The support member 26 defines an aperture 34 proximate the receiving cavity 30. A one-way valve 38 is coupled to the support member 26 and is disposed within the aperture 34. A fan 42 is coupled to the support member 26. The fan 42 includes an outlet 46 aligned with the aperture 34. A controller 50 is operably coupled to the fan 42. The controller 50 is configured to activate the fan 42 to blow air from the interior 22 to an area external to the vehicle body 18 through the one-way valve 38.

Referring to FIG. 1, the vehicle 14 includes the interior 22 having multiple seating assemblies 54 disposed therein. The vehicle 14 may be a sedan, a sport-utility vehicle, a van, a truck, a crossover, or another style vehicle 14. The vehicle 14 may be a manually operated vehicle 14 (e.g., with a human driver), a fully autonomous vehicle (e.g., no human driver), or a partially autonomous vehicle 14 (e.g., may be operated with or without a human driver). Additionally, the vehicle 14 may be utilized for personal and/or commercial purposes, such as, for providing services (e.g., chauffeuring and/or ride-sharing services).

Figure 2:
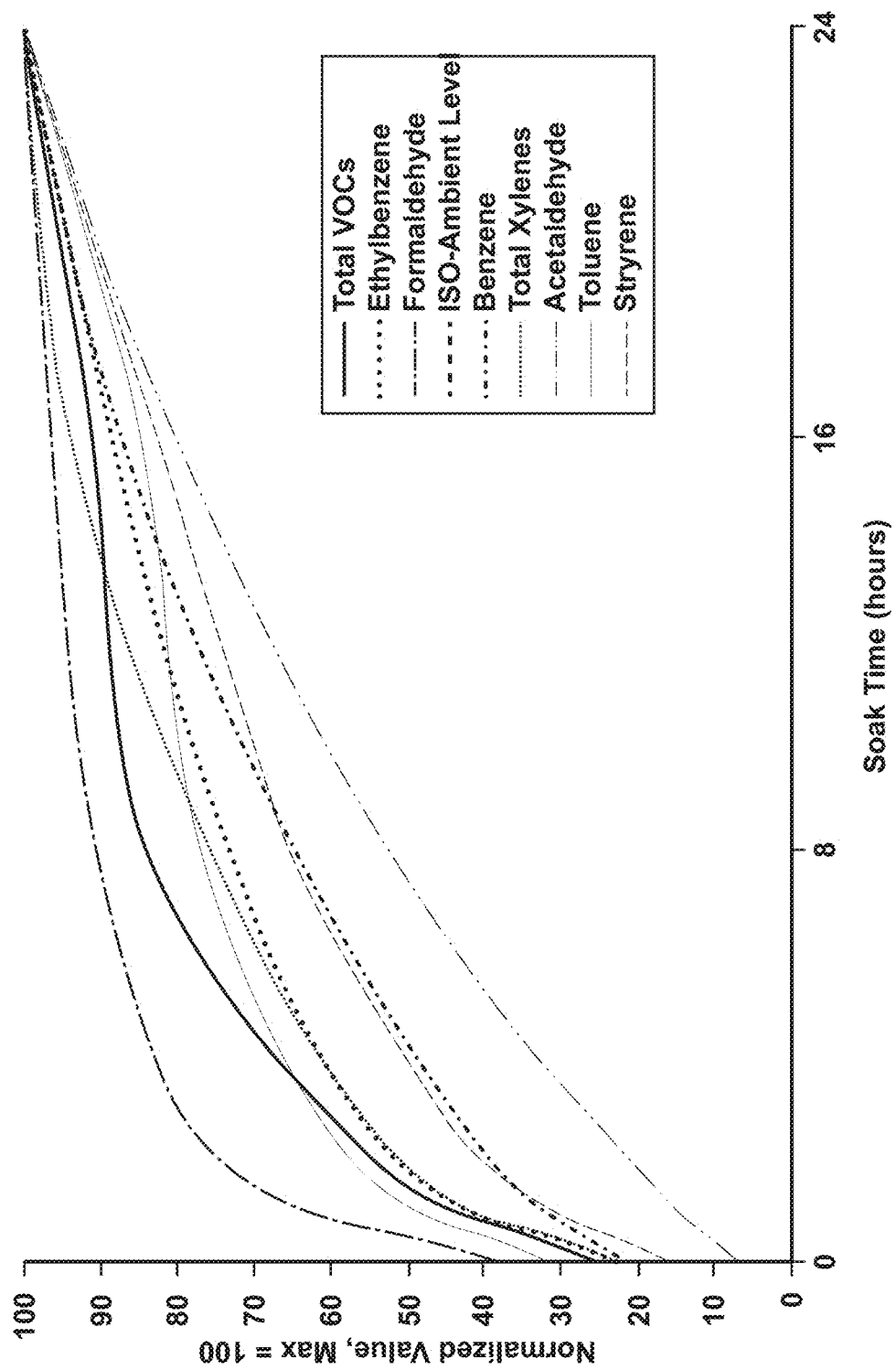
FIG. 2 is a graph illustrating normalized values of volatile organic compounds relative to time, according to one example.

Referring to FIGS. 1 and 2, the interior 22 of the vehicle 14 may have a "new car smell" as a characteristic of newly manufactured vehicles 14. The "new car smell" may be created by volatile organic compounds (VOCs). VOCs are organic chemicals having low boiling points and high vapor pressure at ambient temperatures. The VOCs may become attached, or embedded, within porous materials (e.g., foams, fabrics, carpets, etc.) within the vehicle 14, such as, the material of the seating assemblies 54, the headliner, the carpet, and other components including similar materials. As illustrated in FIG. 2, VOCs can be reduced within the interior 22 (e.g., soak time=0 hours), however, between 16 and 24 hours after VOCs have been reduced within the interior 22, the VOCs after return to higher levels. The data illustrated in FIG. 2 represents the increase in VOCs after a single one minute purge or clearing of the VOCs out of the interior 22. As such, after purging the interior 22 of the vehicle 14 of VOCs, the VOCs generally return to maximum values within 16 to 24 hours of the purge.

Figure 3:
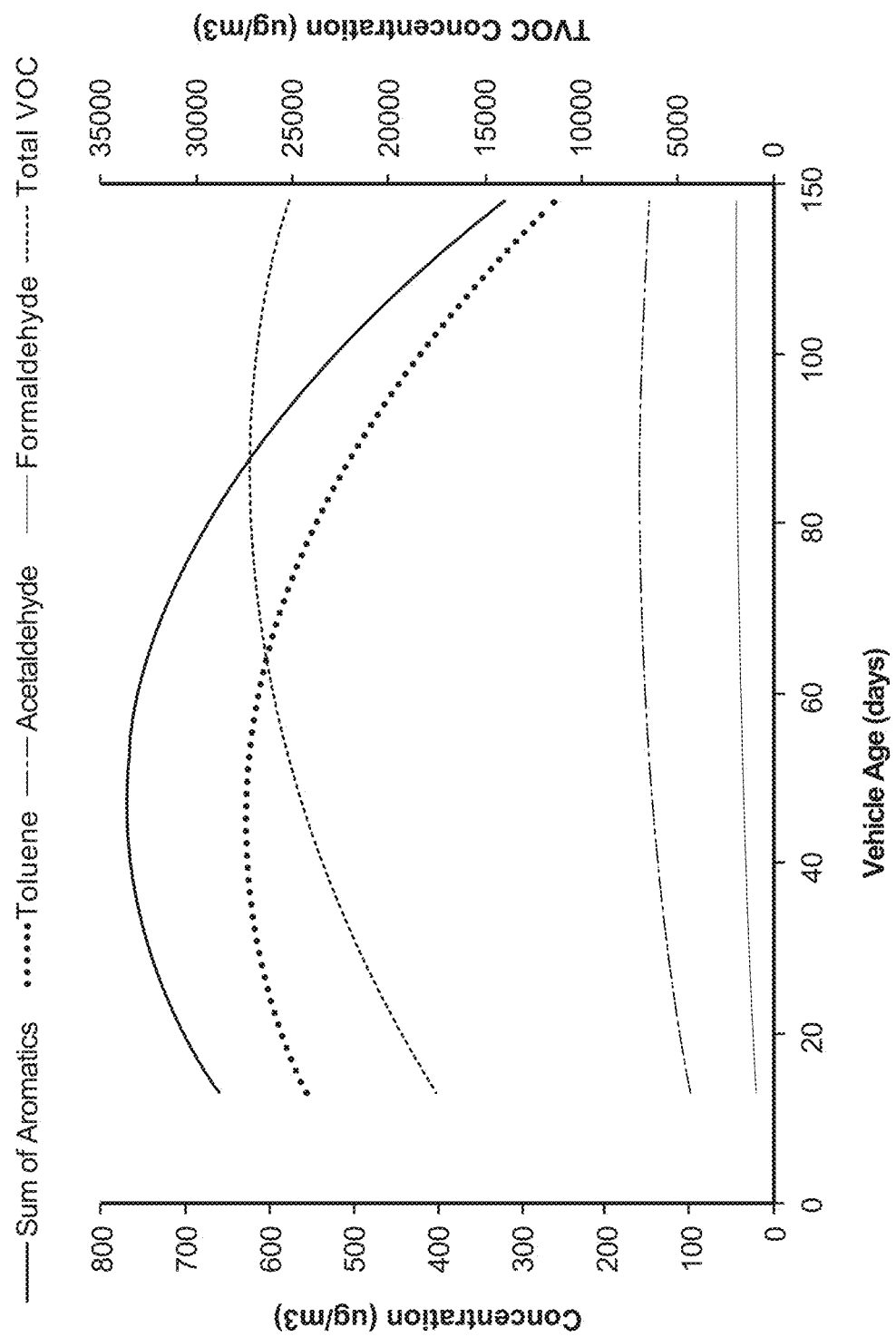
FIG. 3 is a graph illustrating concentrations of volatile organic compounds relative to time, according to one example.

Referring to FIG. 3, the data depicted in the graph illustrates how VOC levels change over time. Some VOCs decline after a period of days, such as toluene. Other VOCs may remain constant over a period of time, such as acetaldehyde and formaldehyde. Further, acetaldehyde may be produced over time, as well as being outgassed from components within the vehicle 14. Accordingly, over a period of days the "new car smell" may be reduced, but may not be fully removed due to the persistence of some of the VOCs within the vehicle 14.

Figure 4A:
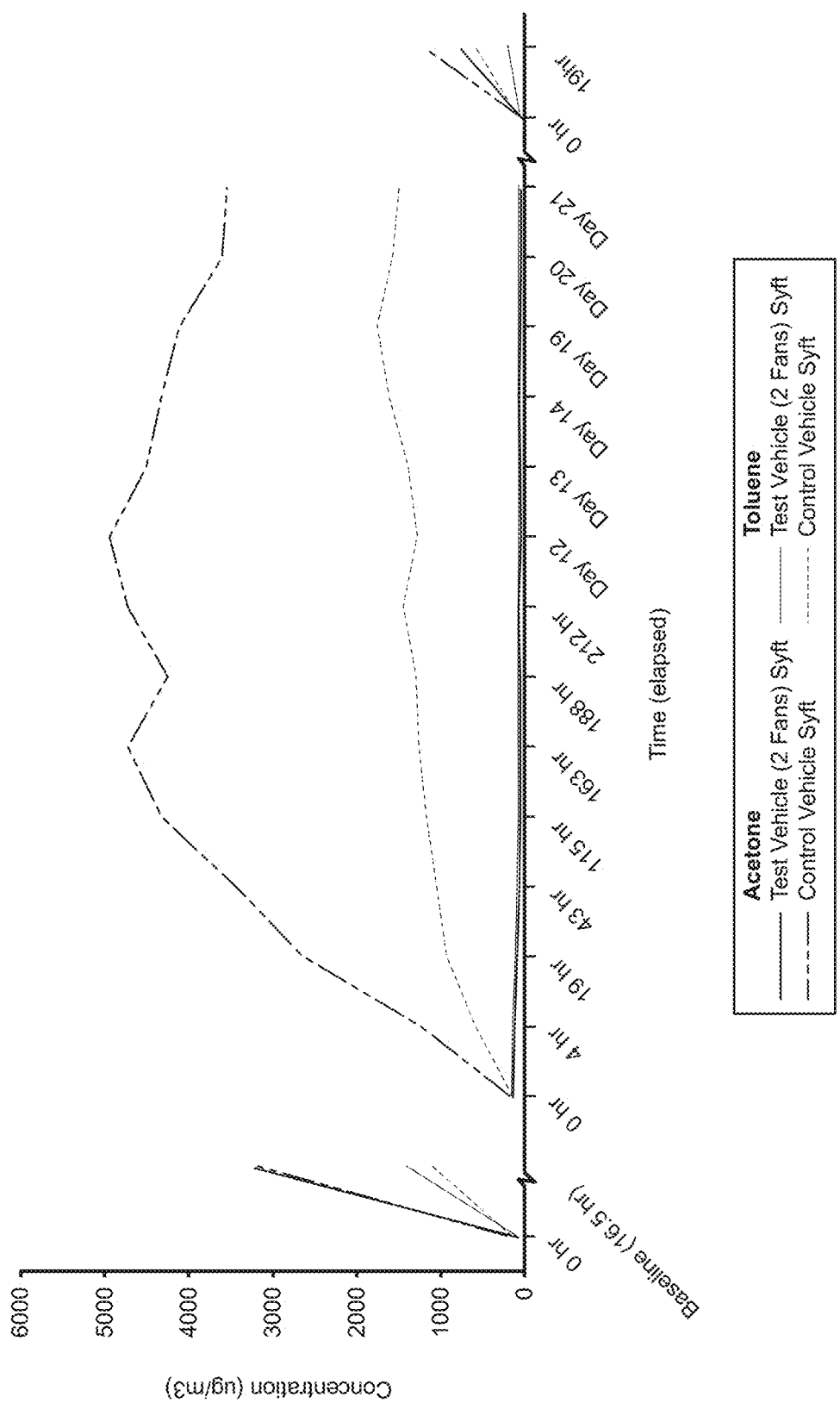
FIG. 4A is a graph illustrating concentrations of volatile organic compounds in control and test vehicle relative to time, according to one example.
Figure 4B:
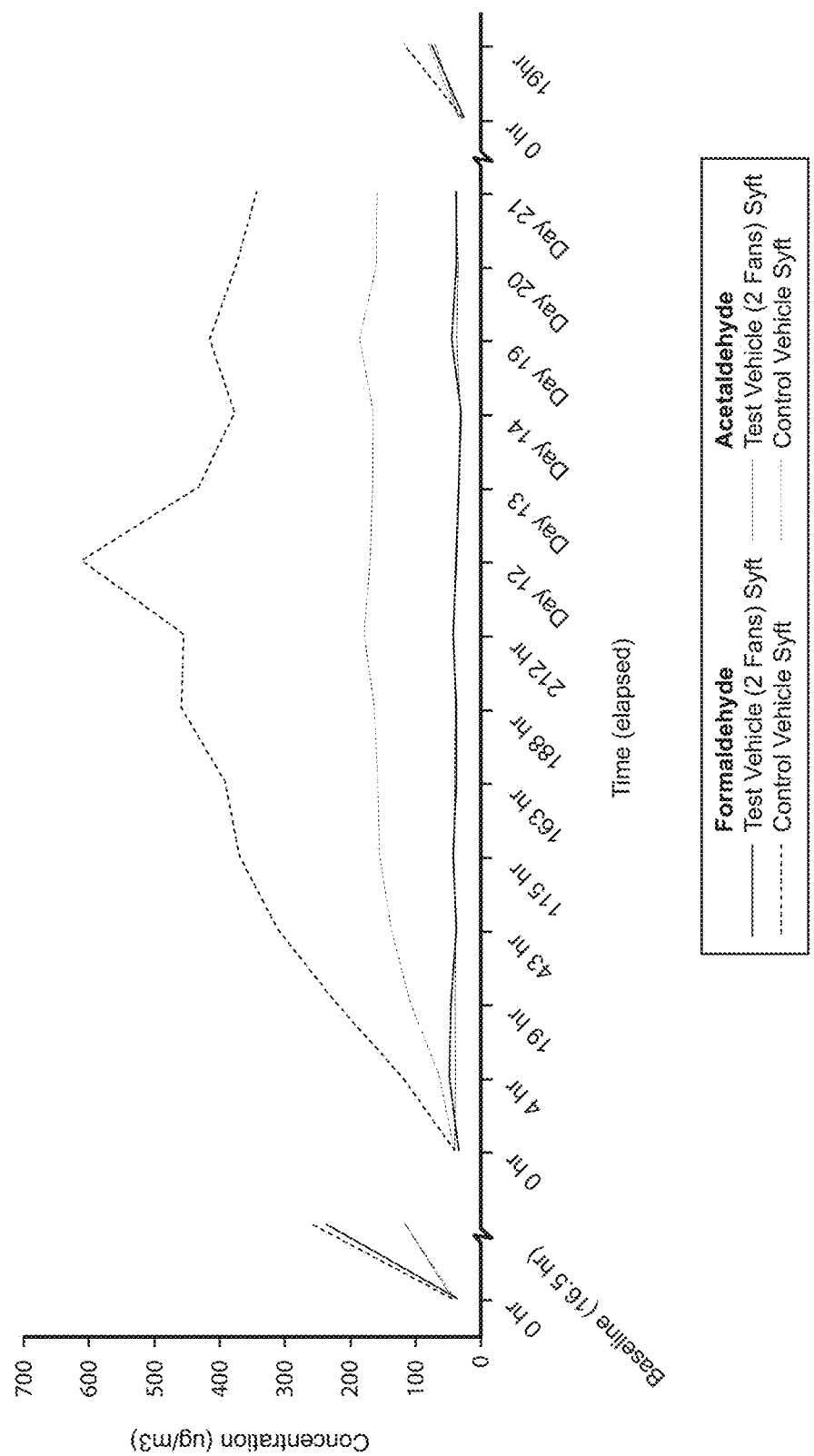
FIG. 4B is a graph illustrating concentrations of volatile organic compounds in control and test vehicle relative to time, according to one example.

Referring to FIGS. 1 and 3-4B, the data illustrated indicates that purging the air in the interior 22 of the vehicle 14 within a predetermined period after the vehicle 14 is newly manufactured, may substantially reduce the VOC levels within the vehicle 14. The data illustrated in FIGS. 4A and 4B show a comparison of vehicles that have not been purged (e.g., a control vehicle) with vehicles 14 that have been purged (e.g., test vehicle). The control vehicles may have substantially higher VOC levels than the test vehicles 14, which were purged using an air purging assembly 58, discussed in detail later herein. The purge for test vehicles 14 of FIGS. 4A and 4B occurred within a predetermined period after the manufacture of the vehicle 14. In various examples, the purge occurs within a timeframe of about zero hours to about 60 days after the completed manufacture of the vehicle 14. When the vehicle 14 was purged within the predetermined period, the VOC levels within the interior 22 may remained substantially reduced relative to the control vehicle.

Figure 5:
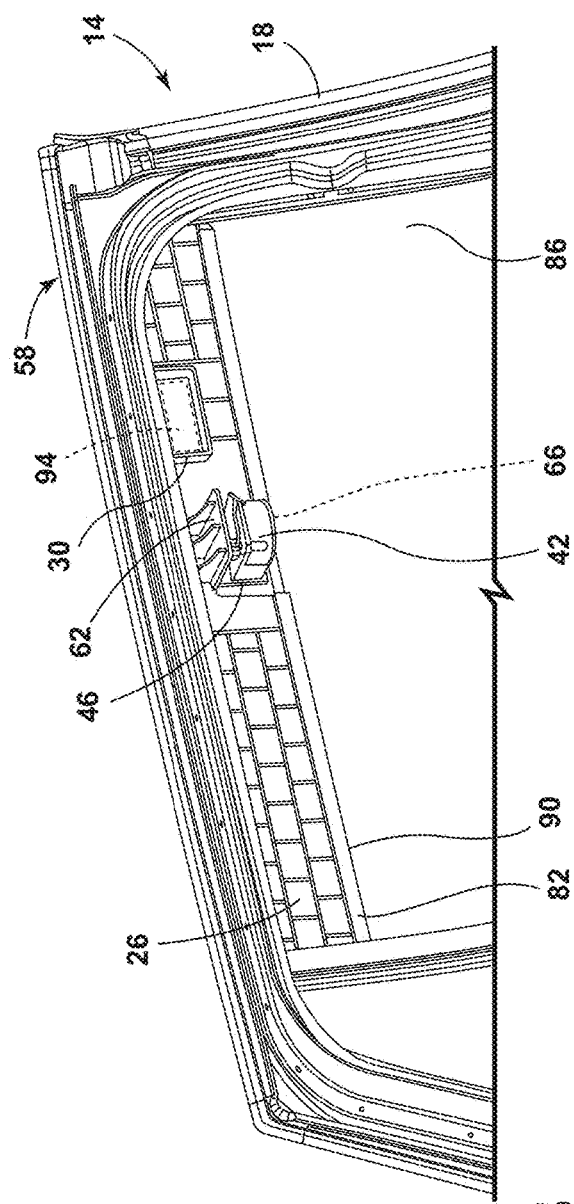
FIG. 5 is a partial rear perspective view of an air purging system coupled to a vehicle window, according to one example.
Figure 6:
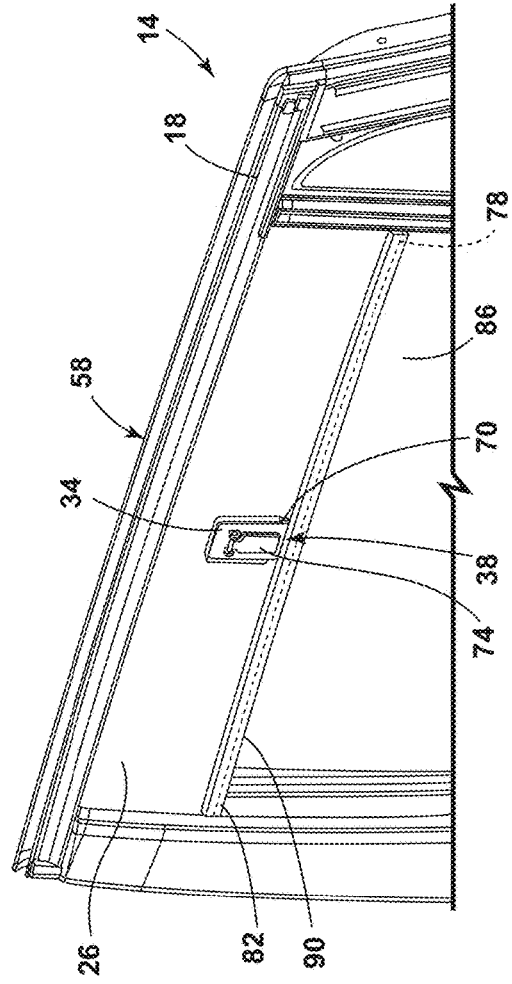
FIG. 6 is a partial front perspective view of the air purging system of FIG. 5.

Referring to FIGS. 5 and 6, a non-limiting example of the air purging assembly 58 is illustrated. In various examples, the air purging assembly 58 may include the support member 26, the fan 42, and the one-way valve 38. The support member 26 may be an elongated member coupled to the vehicle body 18. The support member 26 may define the aperture 34 in a centrally located portion of the support member 26. A mounting flange 62 may extend outwardly from the support member 26 proximate the aperture 34. The mounting flange 62 may extend inward into the interior 22 (FIG. 1) of the vehicle 14.

The fan 42 may be coupled to the support member 26. In various examples, the fan 42 is coupled to the mounting flange 62. The fan 42 may include the outlet 46 and an inlet 66. In this way, the fan 42 may intake air through the inlet 66 and expel air through the outlet 46. The outlet 46 of the fan 42 may be aligned with the aperture 34 defined by the support member 26.

According to various examples, the one-way valve 38 may be coupled to the support member 26 and disposed within the aperture 34. As illustrated in FIG. 6, the one-way valve 38 may include a frame 70 coupled to the support member 26 and a flap 74 rotatably coupled to the frame 70. The flap 74 may be configured to rotate in a single direction away from the frame 70, and may be prevented from rotating in the opposing direction. In this way, the one-way valve 38 may allow air to flow through the one-way valve 38 in a single direction.

Referring still to FIGS. 5 and 6, the support member 26 may define a groove 78 along a peripheral edge 82 thereof. The groove 78 may extend at least along the lower peripheral edge 82 of the support member 26. In this way, the support member 26 may be coupled to a window 86 of the vehicle 14. An upper edge 90 of the window 86 may be disposed within the groove 78. It is also contemplated that the groove 78 may extend along the side or upper peripheral edges 82 of the support member 26 to couple the support member 26 to the vehicle body 18. The support member 26 may extend across the entire upper edge 90 of the window 86. As such, the support member 26 may substantially, or entirely, fill a gap defined between the upper edge 90 of the window 86 and the vehicle body 18.

To install the air purging assembly 58, the window 86 may be lowered producing a gap between the upper edge 90 of the window 86 and the vehicle body 18. The support member 26 may be coupled with the window 86, such that the upper edge 90 may be disposed within the groove 78. The window 86 may then be raised until the support member 26 contacts the vehicle body 18. The support member 26 may be retained between the window 86 and the vehicle body 18.

The support member 26 may define the receiving cavity 30 proximate the fan 42. The power source 94 for the air purging assembly 58 may be disposed within the receiving cavity 30. The power source 94 may be, for example, a removable and/or disposable battery. The power source 94 may be a designated power source 94 for the air purging assembly 58 that is separate from a power source 98 (FIG. 16) of the vehicle 14. In this way, the air purging assembly 58 may operate when the vehicle 14 is in a deactivated condition and/or when the power source 98 is low or empty. The air purging assembly 58 may be advantageous for purging the VOCs from the interior 22 of the vehicle 14 while the vehicle 14 is being shipped and/or is stored at a dealership prior to a customer purchasing the vehicle 14. Once the customer purchases the vehicle 14, the air purging assembly 58 may be removed from the vehicle 14 and reused in a subsequently manufactured vehicle 14.

Referring to FIGS. 7-10, an additional or alternative configuration of the air purging assembly 58 is illustrated. The support member 26 may be coupled to the vehicle body 18. In various examples, the support member 26 may define integrally formed clips 102 extending outwardly therefrom to couple with the vehicle body 18 (e.g., sheet metal). It is contemplated that the support member 26 may include any practicable coupling member for coupling the support member 26 to the vehicle body 18.

The support member 26 may define the mounting flange 62 extending outwardly therefrom. The fan 42 may be coupled to the mounting flange 62. The fan 42 may be positioned, such that the outlet 46 is in fluid communication with the aperture 34, and accordingly, the one-way valve 38.

Figure 7:
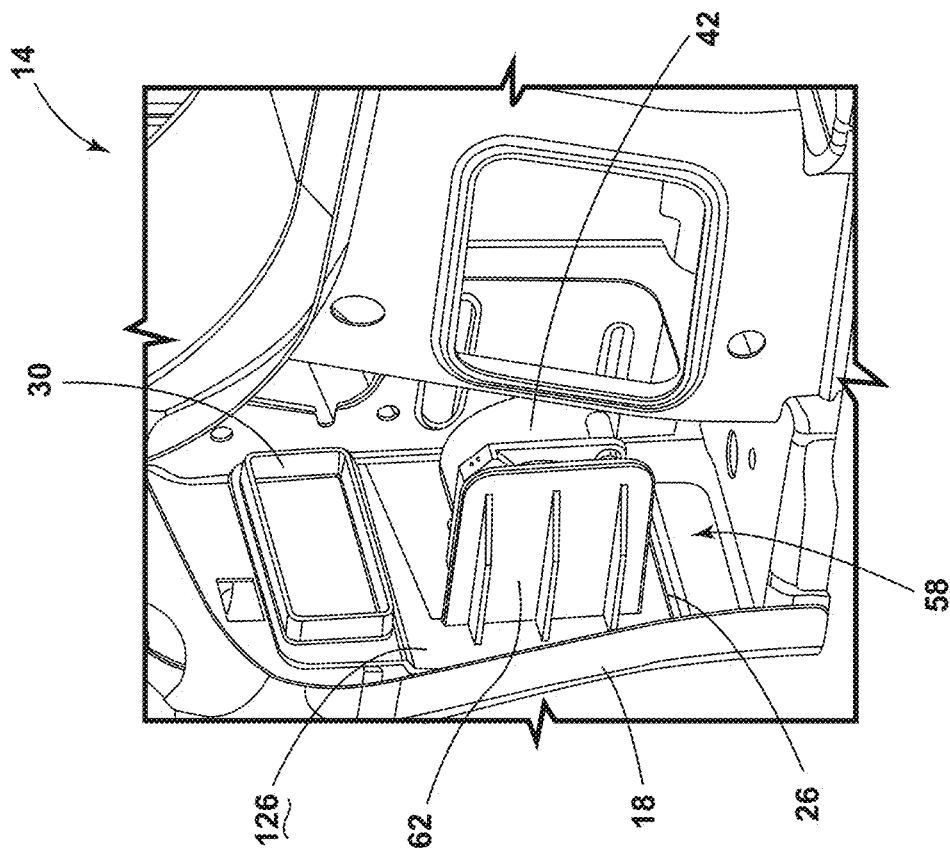
FIG. 7 is a partial front perspective view of an air purging system coupled to a vehicle body, according to one example.
Figure 8:
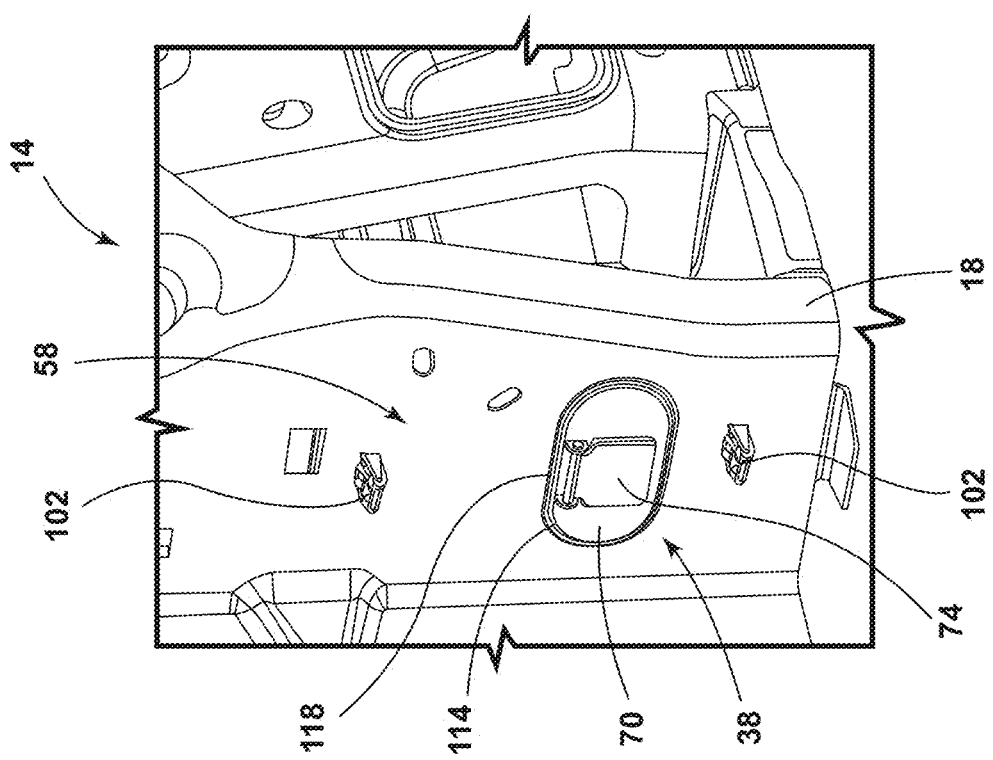
FIG. 8 is a partial rear perspective view of the air purging system of FIG. 7.
Figure 10:
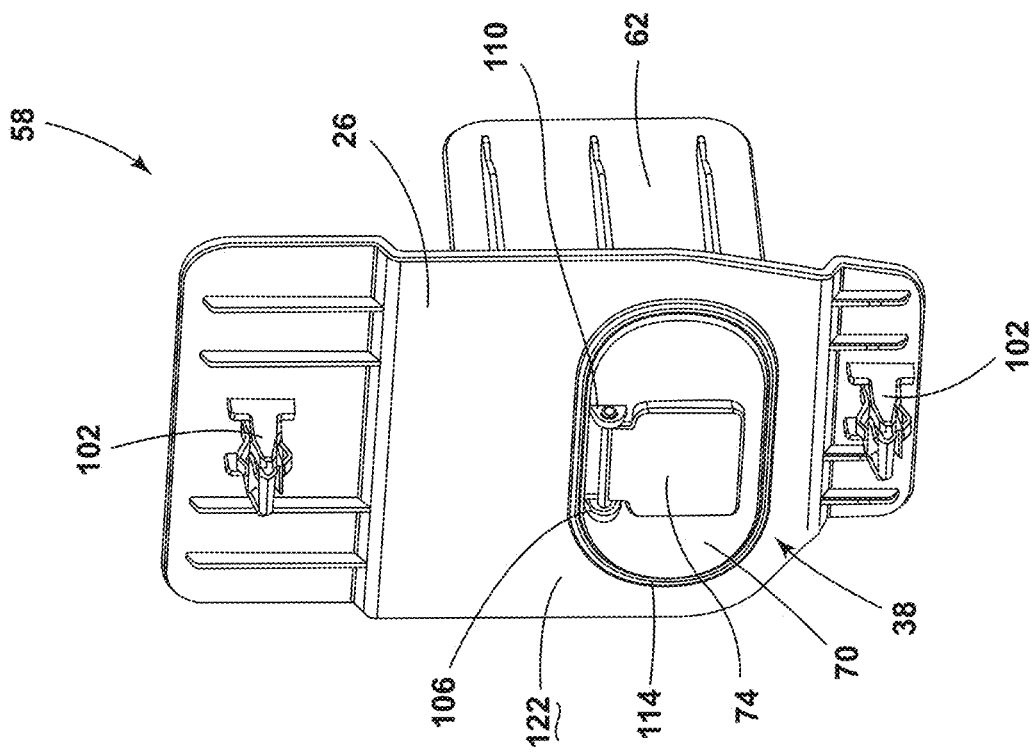
FIG. 10 is a front perspective view of the air purging system of FIG. 9.
Figure 9:
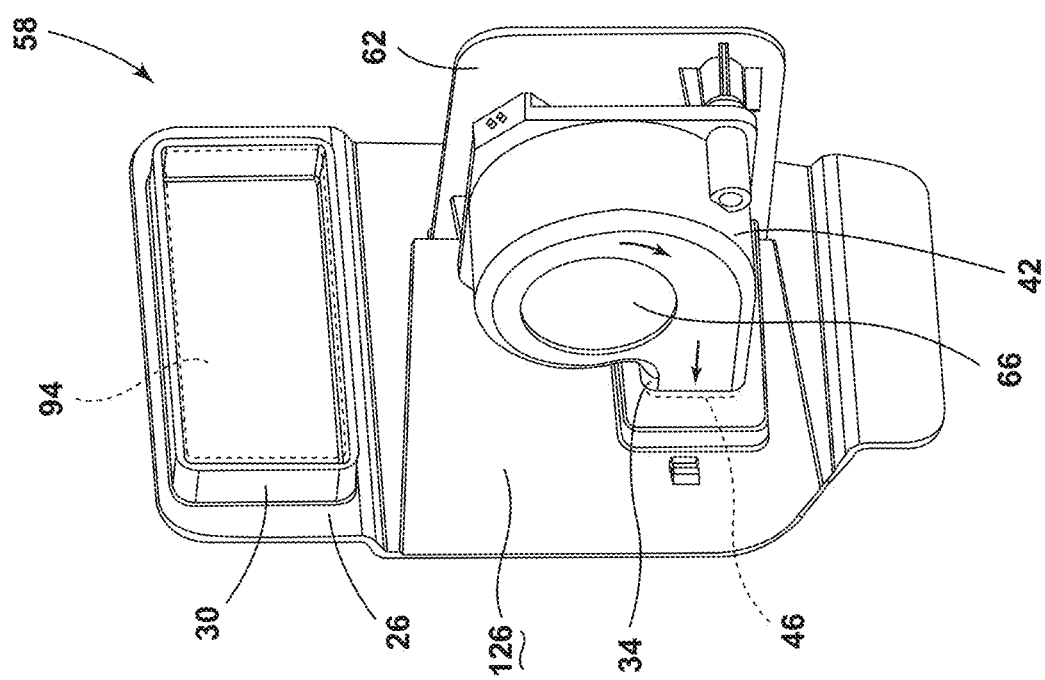
FIG. 9 is a side perspective view an air purging system for a vehicle, according to one example.
Figure 12:
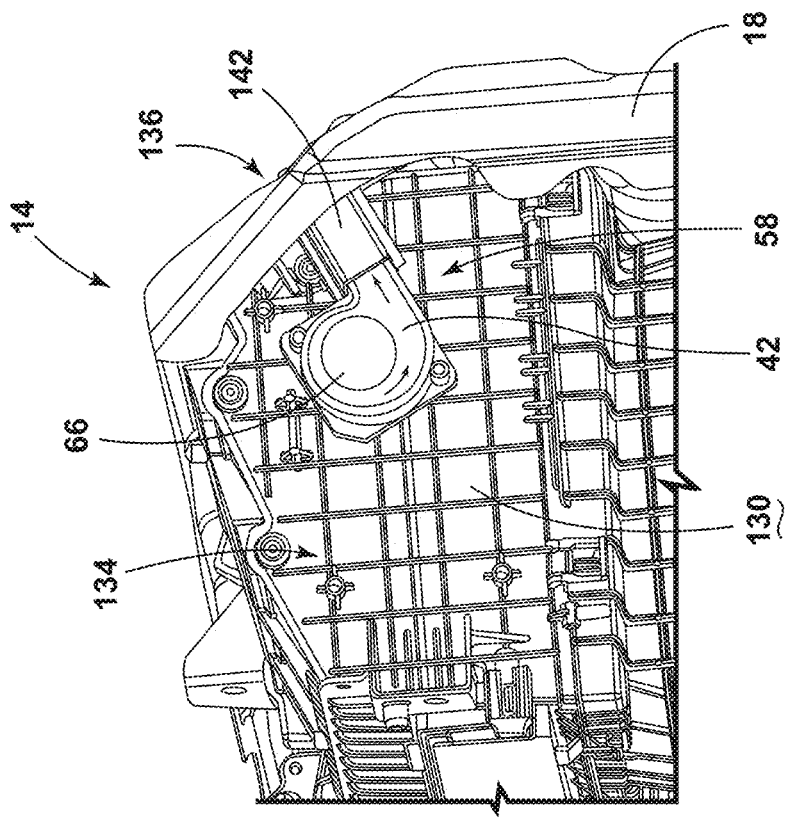
FIG. 12 is a partial side perspective view of the air purging system of FIG. 11.
Figure 11:
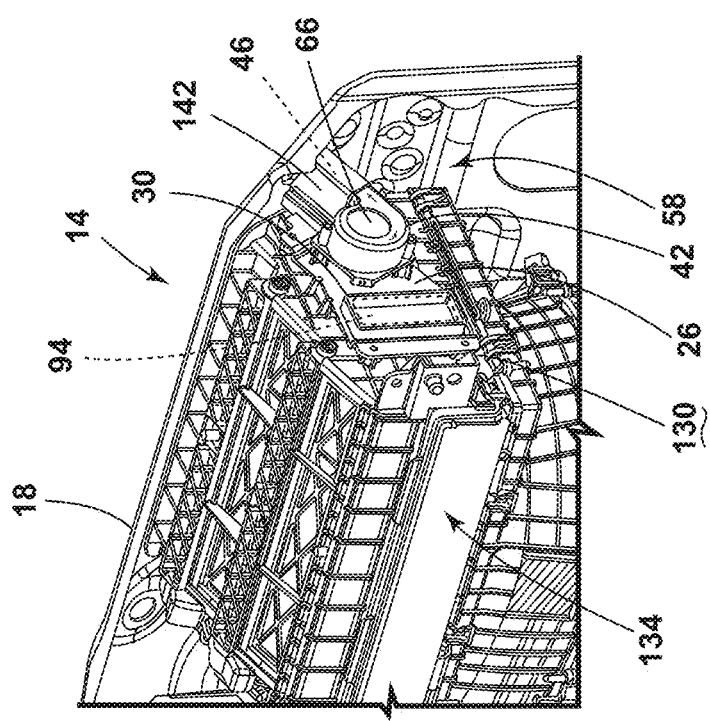
FIG. 11 is a partial side perspective view of an air purging system coupled to a vehicle heating, ventilation, and air conditioning (HVAC) system, according to one example.

The one-way valve 38 may have a substantially similar configuration as the one-way valve 38 as depicted in FIGS. 5 and 6. As best illustrated in FIGS. 7 and 10, the one-way valve 38 may include the frame 70 and the flap 74. The frame 70, in the depicted example, is a substantially oblong shape, but may be any practicable shape based on the configuration of the vehicle body 18. A pair of coupling members 106, 110 may extend from the frame 70 outward from the support member 26. The flap 74 may be rotatably coupled to the coupling members 106, 110 to allow the flap 74 to rotate in a single direction away from the frame 70. The flap 74 may at least partially rest on the frame 70 when in a closed position. This configuration may prevent the flap 74 from rotating to allow air to enter the vehicle 14.

Referring still to FIGS. 7-10, a gasket or seal 114 may be disposed between the support member 26 and the one-way valve 38. The seal 114 may extend around a peripheral edge 82 of the frame 70. The seal 114 may prevent air from flowing between the support member 26 and the one-way valve 38 and into the vehicle 14.

In the depicted example of FIGS. 1 and 7-10, the vehicle body 18 defines a drain hole 118. Typically, the drain hole 118 is advantageous for when a primer is added to the vehicle body 18. The primer may drip off of the vehicle body 18 through the drain hole 118. The drain hole 118 may be filled by a drain plug. Additionally or alternatively, the drain hole 118 may be filled by the air purging assembly 58. The air purging assembly 58 and the drain plug may be interchangeable with one another. The configuration of the air purging assembly 58 may depend on the configuration of the vehicle body 18 proximate the drain hole 118. The one-way valve 38 may align with the drain hole 118. The shape and/or size of the one-way valve 38 may correspond with the shape and/or size of the drain hole 118. A first surface 122 of the air purging assembly 58 may abut the vehicle body 18. The fan 42 may be coupled to a second surface 126 of the air purging assembly 58. The second surface 126 may be oriented toward the interior 22, such that the fan 42 is positioned within the interior 22 of the vehicle 14. The clips 102 may extend from the first surface 122 and engage the vehicle body 18. The seal 114 may be disposed between the one-way valve 38 and the vehicle body 18. In this way, the seal 114 may prevent air from entering the interior 22 between the vehicle body 18 and the air purging assembly 58.

The support member 26 may define the receiving cavity 30 on the second surface 126 thereof. The air purging assembly 58 depicted in FIGS. 7-10 may be a more compact configuration relative to the configuration depicted in FIGS. 5 and 6. Further, the air purging assembly 58 illustrated in FIGS. 7-10 may be installed within the vehicle 14 during the manufacturing process. The air purging assembly 58 may be a permanent fixture within the vehicle 14, or alternatively, may be removed and/or replaced with the drain plug.

The air purging assembly 58 as depicted in FIGS. 7-10 may be positioned in the drain hole 118 or elsewhere in the vehicle 14 and operate in a similar manner. For example, the support member 26 may be coupled with at least one of the C-pillar and/or D-pillar of the vehicle 14. The outlet 46 of the fan 42 may be coupled with a tube that extends to an air extractor to allow the fan 42 to blow air through the tube and through the air extractor. Additionally or alternatively, the support member 26 may be coupled to an A-pillar of the vehicle 14. The fan 42 may be coupled with a drain tube that can extend through a sunroof or a moonroof of the vehicle 14. In another non-limiting example, the air purging assembly 58 may be coupled with a liftgate of the vehicle 14. The air purging assembly 58 may be additionally or alternatively coupled with a floor console of the vehicle 14 and in fluid communication with an area external to the vehicle 14. Further, in another non-limiting example, the air purging assembly 58 may be coupled with an instrument panel of the vehicle 14 and in fluid communication with a cowl area 136 of the vehicle 14 to blow air to the external area proximate the vehicle 14.

Referring to FIGS. 11-15, the air purging assembly 58 may be coupled to an outer surface 130 of a heating, ventilation, and air conditioning (HVAC) system 134. The air purging assembly 58 may be a component separate from, and independently operated from, the HVAC system 134. The air purging assembly 58 may include the support member 26 defining the receiving cavity 30 for the power source 94 to be positioned therein. The fan 42 may be coupled to the support member 26 and may be in fluid communication with the one-way valve 38. The first surface 122 of the support member 26 may abut the outer surface 130 of the HVAC system 134. The power source 94 and the fan 42 may be coupled to the second surface 126 of the support member 26. The support member 26 may define one or more receiving holes 138 configured to receive fasteners. In this way, the support member 26 may be mechanically fastened to the HVAC system 134. The fasteners may be, for example, screws, pins, rivets, or any other mechanical fastener. Additionally or alternatively, the support member 26 may include clips 102 (as best illustrated in FIG. 7) for coupling the support member 26 to the HVAC system 134.

Figure 15:
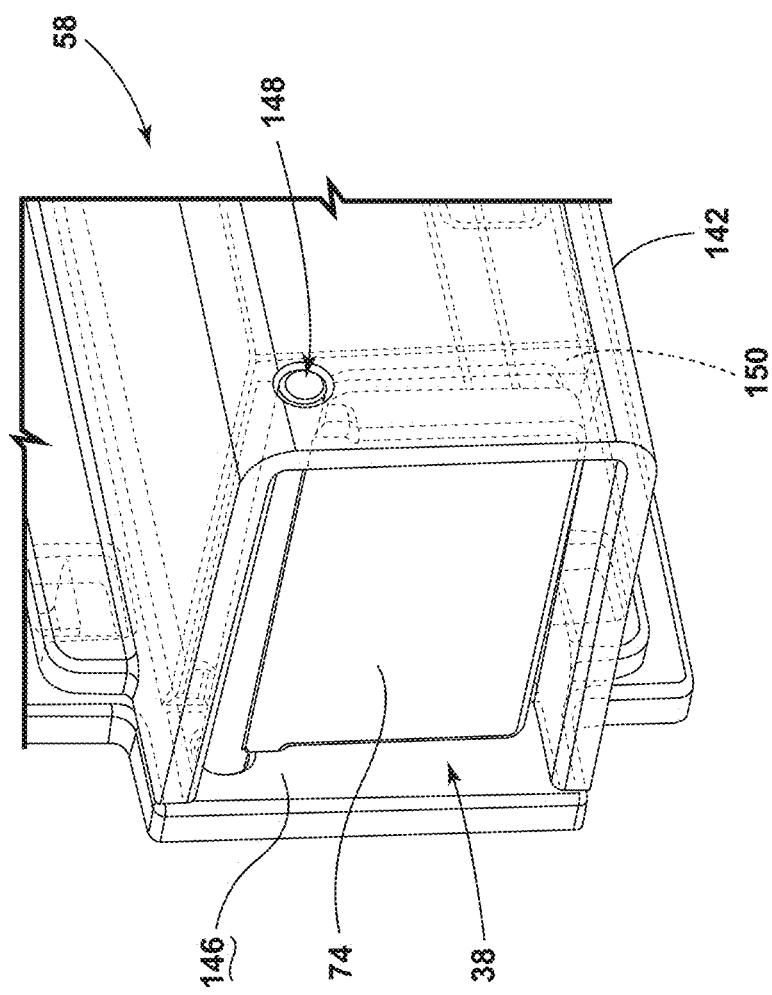
FIG. 15 is a partial front perspective view of a one-way valve of the air purging system of FIG. 14.

The air purging assembly 58 may include a nozzle 142 extending between the outlet 46 of the fan 42 and the one-way valve 38. The nozzle 142 may direct air expelled by the fan 42 through the one-way valve 38. The one-way valve 38 may include the flap 74 configured to rotate in a single direction. As best illustrated in FIG. 15, the flap 74 may be rotatably coupled with an interior surface 146 of the nozzle 142. The flap 74 may also extend at least partially through the nozzle 142. In such configurations, the flap 74 may include projections 148 that extend through the nozzle 142 to rotatably couple the flap 74 to the nozzle 142. At least one of the one-way valve 38 and the nozzle 142 may include a stopping structure 150 that prevents the flap 74 from rotating into the nozzle 142. As such, the flap 74 may rotate out of the nozzle 142 to allow air to be expelled from the interior 22 of the vehicle 14.

Referring still to FIGS. 11-15, the air purging assembly 58 may be in fluid communication with the cowl area 136 of the vehicle 14. The air purging assembly 58 may blow air from the interior 22 of the vehicle 14 out through the cowl area 136 to an area external to the vehicle 14. The air purging assembly 58 may be associated with an existing cowl area 136, or alternatively, the vehicle body 18 may define an additional cutout 158 associated with the air purging assembly 58. The cutout 158 may be sealed with a plug or other sealant when the air purging assembly 58 is deactivated.

The air purging assembly 58 may be coupled to any practicable location on the HVAC system 134. In non-limiting examples, the air purging assembly 58 may be disposed proximate an air intake location or a drain tube location of the HVAC system 134. The air purging assembly 58 may include the power source 94, which may be a separate designated power source 94 relative to the power source 98 of the vehicle 14. Additionally or alternatively, the air purging assembly 58 associated with the HVAC system 134 may be powered by the power source 98 of the vehicle 14. The air purging assembly 58 may be configured to reduce heated air proximate electronic modules adjacent to the instrument panel and circulate cooler air.

Figure 16:
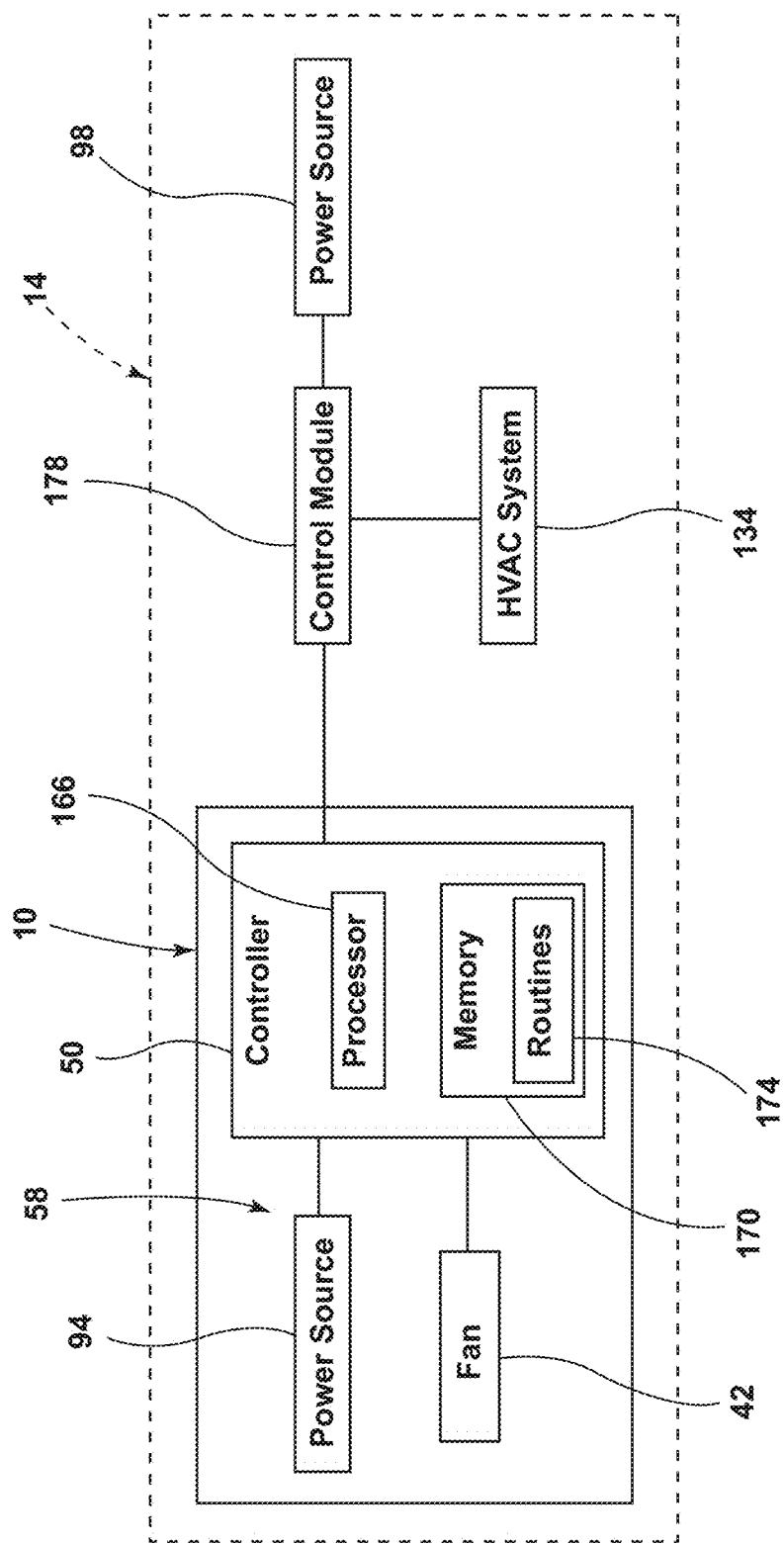
FIG. 16 is a box diagram of a vehicle including an air purging system, according to one example.

With reference to FIG. 16, and with further reference to FIGS. 5-15, the controller 50 of the air purging system 10 may be operably coupled with the air purging assembly 58. The controller 50 may include a processor 166, a memory 170, and other control circuitry. Instructions or routines 174 may be stored within the memory 170, and executed by the processor 166. The controller 50 may include one or more routines 174 for controlling the fan 42. The controller 50 may be configured to activate the fan 42 to blow air from the interior 22 of the vehicle 14 to an area external to the vehicle 14 through the one-way valve 38. For example, the controller 50 may include one or more routines 174 relating to operation speeds of the fan 42, which may be adjustable via pulse width modulation. In this way, the controller 50 may activate the fan 42 to purge the interior 22 of the vehicle 14 of VOCs.

In various examples, the controller 50 may be configured to activate the fan 42 for a predetermined amount of time at predetermined intervals. In a non-limiting example, the predetermined amount of time may be in a range of from about one minute to about 15 minutes. Additionally or alternatively, the predetermined intervals may be in a range of from about 30 minutes to about 90 minutes. The predetermined amount of time in the predetermined intervals may be based on the size and/or power of the fan 42. The controller 50 may be configured to activate the fan 42 at the predetermined intervals for the predetermined amount of time during the predetermined period the predetermined period may be in a range of from about zero hours to about 60 days after the completed manufacture of the vehicle 14. Alternatively, the controller 50 may be configured to activate the fan 42 until the power source 94 may no longer provide power to the air purging assembly 58. The fan 42 may be selectively activated by the controller 50 during the predetermined period. Moreover, the fan 42 may be selectively activated by the controller 50 independent from the HVAC system 134, which may be controlled by a vehicle control module 178. Stated differently, the air purging assembly 58 may operate independently from the activation or deactivation status of the HVAC system 134.

In operation, the air purging assembly 58 may reduce the level of VOCs within the interior 22 of the vehicle 14. The air purging assembly 58 may be coupled to or otherwise installed on the vehicle body 18 during the manufacturing process. During shipment of the vehicle 14, and prior to the purchase of the vehicle 14, the air purging assembly 58 may circulate air within the interior 22 of the vehicle 14. The air purging assembly 58 may circulate significantly less air within the interior 22 when activated than the HVAC system 134 would circulate when activated. However, the air purging assembly 58 may operate when the vehicle 14 is in the deactivated condition. In this way, the air purging assembly 58 may operate independently of the activation of the vehicle 14. The controller 50 may activate the fan 42 of the air purging assembly 58 for a predetermined amount of time at predetermined intervals. The air purging assembly 58 may generally operate in a predetermined period from about zero hours to about 60 days after completed manufacture of the vehicle 14. The fan 42 may intake air within the interior 22 through the inlet 66 and expel the air through the outlet 46 and the one-way valve 38. The fan 42 may be configured to blow air from the interior 22 through the one-way valve 38 to an area external to the vehicle 14. The one-way valve 38 may prevent air from entering the vehicle 14 through the air purging assembly 58.

Figure 17:
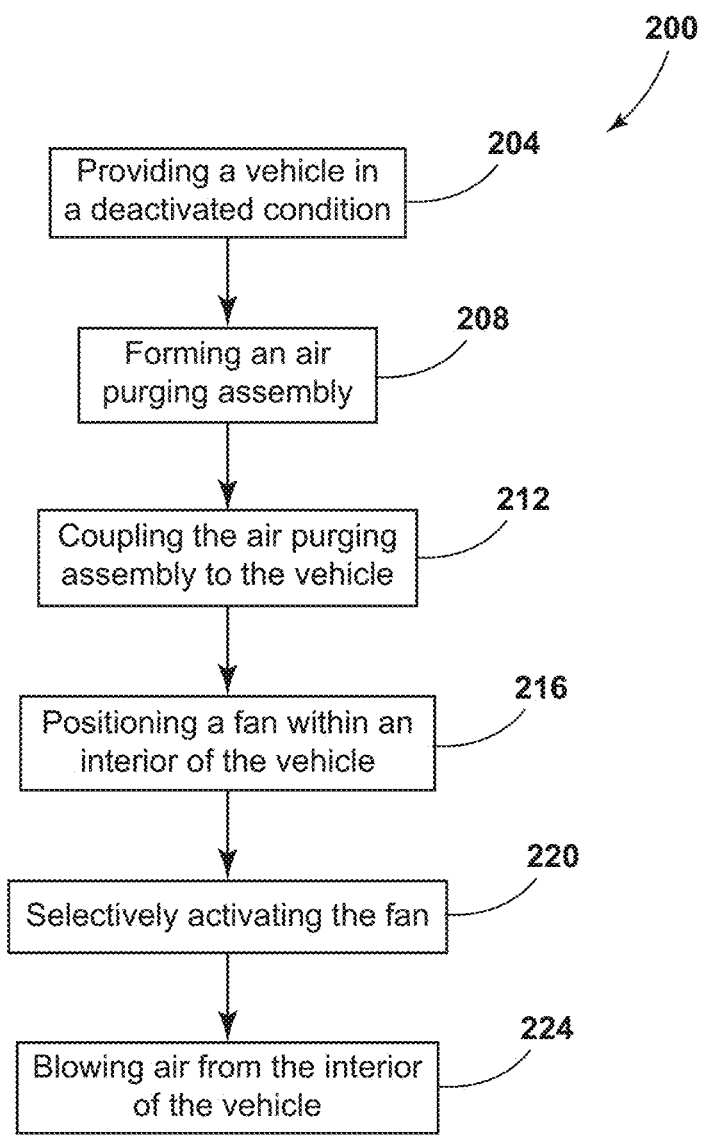
FIG. 17 is a flow diagram of a method of purging air from within a vehicle.

Referring to FIG. 17, and with further reference to FIGS. 1-16, a method 200 for purging air from the vehicle 14 includes step 204 of providing the vehicle 14 in a deactivated condition. The vehicle 14 may be in a shipment process, held at a dealership, or otherwise being stored and not actively driven. In the deactivated condition, the vehicle 14 may not be supplying power to features within the vehicle 14.

In step 208, the air purging assembly 58 may be formed. The fan 42 may be coupled to the support member 26. The power source 94 may be disposed within the receiving cavity 30 of the support member 26. The fan 42 may be in fluid communication with the one-way valve 38.

In step 212, the air purging assembly 58 may be coupled to the vehicle 14. The air purging assembly 58 may be selectively coupled to the vehicle body 18. In the non-limiting example, the air purging assembly 58 may be coupled to the window 86 of the vehicle 14. In another non-limiting example, the air purging assembly 58 may be coupled to the vehicle body 18 proximate the drain hole 118. In such configurations, the fan 42 may be configured to blow air through the drain hole 118. In additional or alternative non-limiting examples, the air purging assembly 58 may be coupled to the A-pillar, the C-pillar, the D-pillar, the liftgate, the floor console, and/or the instrument panel. One or more purge assemblies 58 may be coupled to the vehicle 14.

In step 216, the fan 42 is positioned within the interior 22 of the vehicle 14. The fan 42 may be positioned, such that the fan 42 may intake air through the inlet 66 that is within the interior 22 of the vehicle 14. Step 216 may include positioning the fan 42 in fluid communication with an area external to the vehicle 14. In this way, the fan 42 can intake air from the interior 22 and blow the air out of the vehicle 14 to an area external to the vehicle 14 via the one-way valve 38.

In step 220, the fan 42 may be selectively activated by the controller 50. The controller 50 may receive an input to begin the purging process and activate the fan 42. Additionally or alternatively, the controller 50 may send a signal to activate the fan 42 when the power source 94 is coupled to the air purging assembly 58.

In step 224, the fan 42 may blow air from the interior 22 of the vehicle 14 to an area external to the vehicle 14. In this way, the air purging assembly 58 may circulate the air within the vehicle 14. The circulation of the air may reduce the VOC levels within the vehicle 14. Step 220 and/or step 224 may include the vehicle 14 remaining in the deactivated condition. As such, the air purging assembly 58 may operate independently of the vehicle 14 and may continue to operate when the power source 98 of the vehicle 14 is low and/or empty.

Use of the present device may provide for a variety of advantages. For example, the air purging assembly 58 may operate separately and independently of the vehicle 14. Further, the air purging assembly 58 may operate separately and independently from the HVAC system 134. Additionally, the air purging assembly 58 may be removed and/or reused with subsequently manufactured vehicles 14. Moreover, the air purging assembly 58 may operate while the vehicle 14 is being shipped, or otherwise, not being activated. In this way, the air purging assembly 58 may circulate the air within the interior 22 prior to the customer receiving the vehicle 14. The customer may then receive the vehicle 14 without a noticeable "new car smell," or a significantly reduced level of the "new car smell" due to a reduced level of VOCs. Also, the air purging assembly 58 may operate within a predetermined period, which may be in a range of about zero hours to about 60 days after completion of the manufacture of the vehicle 14. The operation of the air purging assembly 58 within the predetermined period may significantly reduce the VOC levels within the interior 22 beyond the predetermined period. The air purging assembly 58 may reduce the VOC levels within the interior 22, and may cause a permanent decrease in the VOC levels within the vehicle 14. Additional benefits or advantages of using this device may also be realized and/or achieved.

According to various examples, a vehicle air purging system includes a vehicle body that defines an interior. A support member is coupled to the vehicle body. The support member defines a receiving cavity. The support member defines an aperture proximate the receiving cavity. A one-way valve is coupled to the support member and is disposed within the aperture. A fan is coupled to the support member. The fan includes an outlet aligned with the aperture. A controller is operably coupled to the fan. The controller is configured to activate the fan to blow air from the interior to an area external to the vehicle body through the one-way valve. Embodiments of the present disclosure may include one or a combination of the following features:

- a window, and a support member defines a groove along a peripheral edge to receive an upper edge of the window;
- a support member extends across an entire upper edge of a window, and the support member is retained between the window and a vehicle body;
- a designated power source is disposed within a receiving cavity, and the designated power source is operably coupled with a fan;
- a vehicle body defines a drain hole, and a support member is disposed proximate the drain hole and a one-way valve is aligned with the drain hole;
- a seal disposed between a support member and a one-way valve; and
- a heating, ventilation, and air conditioning (HVAC) system, and a support member is coupled to an outer surface of the HVAC system.

According to various examples, an air purging system for a vehicle includes a support member. A fan is coupled to the support member. A one-way valve is in fluid communication with the fan. The fan is configured to direct air through the one-way valve. A power source is coupled to the support member. The power source is operably coupled to the fan. A controller is operably coupled to the fan. The controller is configured to activate the fan. Embodiments of the present disclosure may include one or a combination of the following features:

- a controller is configured to activate a fan for a predetermined amount of time at predetermined intervals;
- a predetermined amount of time is in a range of from about one minute to about 15 minutes, and the predetermined intervals are in a range of from about 30 minutes to about 90 minutes;
- a nozzle extends between an outlet of a fan and a one-way valve;
- a one-way valve is rotatably coupled with an interior surface of a nozzle;
- a support member defines a groove along a peripheral edge to receive an upper edge of a window;
- a heating, ventilation, and air conditioning (HVAC) system, and a support member is coupled to an outer surface of the HVAC system, and a fan is selectively activated by a controller independent of the HVAC system; and a support member defines a mounting flange, and a fan is coupled with the mounting flange.

According to various examples, a method for purging air from within an interior of a vehicle includes providing the vehicle in a deactivated condition. An air purging assembly is formed having a support member coupled to a fan. The air purging assembly is coupled to the vehicle. The fan is positioned within an interior of the vehicle and is in fluid communication with an area external to the vehicle. A fan is selectively activated for a predetermined amount of time. Air is blown from the interior to the area external to the vehicle through a one-way valve. Embodiments of the present disclosure may include one or a combination of the follow features:

a vehicle remains deactivated when a fan is activated;

a support member is positioned between a vehicle window and a vehicle body; and a one-way valve is positioned proximate a drain hole defined in a vehicle body.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

At least some examples of the present disclosure have been directed to computer program products including such logic (e.g., in the form of software) stored on any computer usable medium. Such software, when executed in one or more data processing devices, causes a device to operate as described herein.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air purging system, comprising:
    a vehicle body defining an interior;
    a support member selectively coupled to the vehicle body, wherein the support member defines a receiving cavity and an aperture proximate the receiving cavity, and wherein the support member includes a mounting flange adjacent to the aperture and configured to extend from a first side of the support member and into the interior of the vehicle;
    a one-way valve coupled to a second side of the support member and disposed within the aperture, the second side opposing the first side;
    a fan coupled to the mounting flange, wherein a side of the fan is coupled to the mounting flange and an outlet end of the fan abuts the support member adjacent to the aperture, an outlet of the fan being aligned with the aperture and the one-way valve; and
    a controller operably coupled to the fan, wherein the controller is configured to activate the fan to blow air from the interior to an area external to the vehicle body through the one-way valve.

2. The vehicle air purging system of claim 1, further comprising:
    a window, wherein the support member defines a groove along a peripheral edge to receive an upper edge of the window.

3. The vehicle air purging system of claim 2, wherein the support member extends across the entire upper edge of the window, and wherein the support member is retained between the window and the vehicle body.

4. The vehicle air purging system of claim 1, further comprising:
    a designated power source disposed within the receiving cavity, wherein the designated power source is operably coupled with the fan.

5. The vehicle air purging system of claim 1, wherein the vehicle body defines a drain hole, and wherein the support member is disposed proximate the drain hole and the one-way valve is aligned with the drain hole.

6. The vehicle air purging system of claim 5, wherein the support member defines integrally formed clips extending outwardly therefrom to couple with the vehicle body.

7. The vehicle air purging system of claim 1, further comprising:
    a seal disposed between the support member and the one-way valve.

8. The vehicle air purging system of claim 1, further comprising:
    a heating, ventilation, and air conditioning (HVAC) system, wherein the support member is coupled to an outer surface of the HVAC system.

9. An air purging system for a vehicle, comprising:
    a heating, ventilation, and air conditioning (HVAC) system; and
    an air purging assembly coupled to an outer surface of the HVAC system, the air purging assembly including:
        a support member coupled to the outer surface of the HVAC system;
        a fan having a first side coupled to the support member, wherein the side of the fan is spaced from the outer surface of the HVAC system by the support member;
        a nozzle coupled to an outlet end of the fan, the nozzle being coupled to and extending along the support member;
        a one-way valve coupled to the nozzle and in fluid communication with the fan, wherein the fan is configured to direct air through the one-way valve;
        a power source coupled to the support member, wherein the power source is operably coupled to the fan; and
        a controller operably coupled to the fan, wherein the controller is configured to activate the fan at predetermined intervals while said vehicle is in a deactivated state.

10. The air purging system of claim 9, wherein the controller is configured to activate the fan for a predetermined amount of time at the predetermined intervals.

11. The air purging system of claim 10, wherein the predetermined amount of time is in a range of from about one minute to about 15 minutes, and wherein the predetermined intervals are in a range of from about 30 minutes to about 90 minutes.

12. The air purging system of claim 9, wherein the nozzle extends between an outlet of the fan defined in the outlet end thereof and the one-way valve.

13. The air purging system of claim 12, wherein the one-way valve is disposed within the nozzle and rotatably coupled with an interior surface of the nozzle.

14. The air purging system of claim 9, wherein the fan is selectively activated by the controller independent of the HVAC system.

15. The air purging system of claim 9, wherein the support member defines a mounting flange, and wherein the fan is coupled with the mounting flange.

16. A method for purging air from within an interior of a vehicle, comprising:
    providing the vehicle in a deactivated condition;
    forming an air purging assembly having a support member coupled to a fan;
    coupling the air purging assembly to the vehicle;
    positioning the fan within the interior of the vehicle and in fluid communication with an area external to the vehicle;
    selectively activating the fan for a predetermined amount of time to blow air from the interior to the area external to the vehicle through a one-way valve for the predetermined amount of time at predefined intervals as the vehicle remains in the deactivated condition, wherein the fan is activated independently of activation of a heating, ventilation, and air conditioning system of the vehicle;

selectively activating the fan at the predefined intervals for a predefined period of time, wherein the predefined period of time is up to a predefined number of days after completion of a vehicle manufacturing process; and removing the air purging assembly from the vehicle after the predefined number of days.

17. The method of claim 16, further comprising:

positioning the support member between a vehicle window and a vehicle body.

18. The method of claim 16, further comprising:

positioning the one-way valve proximate a drain hole defined in a vehicle body.

\* \* \* \* \*